United States Patent
Lim et al.

(10) Patent No.: US 10,827,489 B2
(45) Date of Patent: *Nov. 3, 2020

(54) METHOD, DEVICE AND SYSTEM FOR COMMUNICATION USING PLURALITY OF WIRELESS COMMUNICATION SCHEMES

(71) Applicant: Samsung Electronics Co., Ltd., Gyeonggi-do (KR)

(72) Inventors: Sang-soon Lim, Seoul (KR); Woo-jin Park, Gyeonggi-do (KR); Dae-hyun Ban, Seoul (KR); Kyu-haeng Lee, Seoul (KR); Seong-won Han, Seoul (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/419,731

(22) Filed: May 22, 2019

(65) Prior Publication Data

US 2019/0289599 A1 Sep. 19, 2019

Related U.S. Application Data

(63) Continuation of application No. 15/374,429, filed on Dec. 9, 2016, now Pat. No. 10,327,239.

(30) Foreign Application Priority Data

Aug. 3, 2016 (KR) ........................ 10-2016-0099064

(51) Int. Cl.
*H04W 72/04* (2009.01)
*H04L 12/26* (2006.01)
(Continued)

(52) U.S. Cl.
CPC ..... *H04W 72/0446* (2013.01); *H04L 43/0864* (2013.01); *H04L 43/16* (2013.01);
(Continued)

(58) Field of Classification Search
None
See application file for complete search history.

(56) References Cited

U.S. PATENT DOCUMENTS

| 6,094,421 A | 7/2000 | Scott |
| 9,025,585 B2 | 5/2015 | Hong et al. |
| | (Continued) | |

FOREIGN PATENT DOCUMENTS

| KR | 1020120139945 | 12/2012 |
| WO | WO 2010/108144 | 9/2010 |

OTHER PUBLICATIONS

International Search Report dated Apr. 25, 2017 issued in counterpart application No. PCT/KR2016/015360, 10 pages.

(Continued)

*Primary Examiner* — Saumit Shah
(74) *Attorney, Agent, or Firm* — The Farrell Law Firm, P.C.

(57) ABSTRACT

A communication method using a plurality of wireless communication schemes includes acquiring information about time durations for communicating using a first communication scheme and a second communication scheme, determining whether a time duration for communicating using the second communication scheme is within the predefined time, comparing a number of stored response messages to a threshold value based on a result of the determining, setting a number of response messages to be transmitted in a time duration for communicating using the first communication scheme based on a result of the comparing, and transmitting at least one response message using the first communication scheme based on setting of the number of response messages to be transmitted.

20 Claims, 14 Drawing Sheets

(51) Int. Cl.
*H04W 24/08* (2009.01)
*H04W 88/06* (2009.01)
*H04W 88/10* (2009.01)
*H04L 29/08* (2006.01)

(52) U.S. Cl.
CPC ............. *H04W 24/08* (2013.01); *H04L 67/12* (2013.01); *H04W 88/06* (2013.01); *H04W 88/10* (2013.01)

(56) References Cited

U.S. PATENT DOCUMENTS

| | | |
|---|---|---|
| 9,295,075 B2 | 3/2016 | Wyper et al. |
| 2008/0144493 A1 | 6/2008 | Yeh |
| 2008/0259837 A1 | 10/2008 | Thoukydides |
| 2009/0141631 A1 | 6/2009 | Kim |
| 2010/0031110 A1 | 2/2010 | Seok |
| 2011/0300858 A1 | 12/2011 | Lee et al. |
| 2012/0164948 A1 | 6/2012 | Narasimha |
| 2013/0156012 A1 | 6/2013 | Raskin et al. |
| 2013/0212293 A1 | 8/2013 | Friedman |
| 2015/0111610 A1 | 4/2015 | Hwang et al. |
| 2016/0014052 A1 | 1/2016 | Han |

OTHER PUBLICATIONS

European Search Report dated Mar. 4, 2019 issued in counterpart application No. 16911733.0-1216, 7 pages.

METHOD, DEVICE AND SYSTEM FOR COMMUNICATION USING PLURALITY OF WIRELESS COMMUNICATION SCHEMES

PRIORITY

This application is a Continuation Application of U.S. patent application Ser. No. 15/374,429, which was filed in the U.S. Patent and Trademark Office on Dec. 9, 2016, and claims priority under 35 U.S.C. § 119(a) to a Korean Patent Application filed on Aug. 3, 2016 in the Korean Intellectual Property Office and assigned Serial No. 10-2016-0099064, the content of each of which is incorporated herein by reference.

BACKGROUND

1. Field of the Disclosure

The present disclosure relates generally to a method, a device, and a system for supporting monitoring of an encrypted communication session, and more particularly, to a method, a device, and a system for preventing a communication speed from slowing down if a plurality of communication schemes are used.

2. Description of the Related Art

The Internet has evolved from a human-based connection network through which a human being generates and consumes information to an Internet of Things (IoT) network through which distributed elements such as things transmit, receive and process information therebetween. An Internet of Everything (IoE) technique in which a big data processing technique and the like through a connection with a cloud server and the like are combined with an IoT technique has also been introduced. To implement IoT, techniques such as a sensing technique, a wired and wireless communication and network infrastructure technique, a service interface technique, and a security technique are needed, and thus, research on techniques for connecting things, such as a sensor network technique, a machine to machine (M2M) communication technique, and a machine type communication (MTC) technique, has recently been conducted.

In an IoT environment, an intelligent technology (IT) service for adding value to life by collecting and analyzing data generated from connected things may be provided. IoT may be applied in fields such as smart home, smart building, smart city, smart car or connected car, smart grid, healthcare, smart home appliance, and advanced medical service fields through fusion and connection between existing IT technology and various industries.

Particularly, in an IoT environment, one device may frequently use a plurality of communication schemes. In other words, a plurality of communication techniques may be used by loading the plurality of communication techniques in a single integrated circuit, or chip, for weight reduction and miniaturization of a device such as a smartphone or a TV. However, if a plurality of communication techniques are used in a time division method, communication speed may slow down.

FIGS. 1A and 1B illustrate graphs related to a communication speed of a device.

Referring to FIGS. 1A and 1B, the graph of FIG. 1A shows a probability density function (PDF) of a round-trip time if a device uses only a first communication scheme and if the device uses the first communication scheme and a second communication scheme in a time division method. In addition the graph of FIG. 1B shows a cumulative density function (CDF) of a round-trip time if a device uses only a first communication scheme and if the device uses the first communication scheme and a second communication scheme in a time division method.

A round-trip time indicates a round-trip time of a packet in a network and is usually used as a measure to indicate a communication speed. Referring to the graphs of FIGS. 1A and 1B, the round-trip time is longer if the first and second communication schemes are used, as compared to if only the first communication scheme is used. That is, if both the first and second communication schemes are used, a communication speed of the first communication scheme of the device is lower than that of if just the first communication scheme is used. If a device uses the first and second communication schemes in a time division method using one (or one set of) antenna(s), the device cannot perform communication using the first communication scheme if the second communication scheme is being used for the communication. Particularly, if a bottleneck phenomenon occurs during communication of a device using the second communication scheme, a response to received data cannot be properly transmitted to a server, and as a result, the server stops transmitting data to the device, thereby reducing the communication speed.

SUMMARY

An aspect of the present disclosure provides methods for preventing a communication speed from slowing down if a plurality of communication schemes are used.

Additional aspects will be set forth in part in the description which follows and, in part, will be apparent from the description, or may be learned by practice of the presented embodiments.

In accordance with an aspect of the present disclosure, a communication method using a plurality of wireless communication schemes is provided. The method includes acquiring information about time durations for communicating using a first communication scheme and a second communication scheme, determining whether a time duration for communicating using the second communication scheme is within the predefined time, comparing a number of stored response messages to a threshold value based on a result of the determining, setting a number of response messages to be transmitted in a time duration for communicating using the first communication scheme based on a result of the comparing, and transmitting at least one response message using the first communication scheme based on setting of the number of response messages to be transmitted.

In accordance with another aspect of the present disclosure, a device using a plurality of wireless communication schemes includes a communication interface, a memory storing one or more instructions, and a processor coupled with the communication interface and the memory and configured to acquire information about time durations for communicating using a first communication scheme and a second communication scheme, determine whether a time duration for communicating using the second communication scheme is within the predefined time, compare a number of stored response messages to a threshold value based on the determination result, set a number of response messages to be transmitted in a time duration for communicating using the first communication scheme based on a result of the comparing, and transmit at least one response message using the first communication scheme based on setting of the number of response messages to be transmitted.

In accordance with another aspect of the present disclosure, a non-transitory computer-readable recording medium is disclosed having recorded a program for implementing a method using a plurality of wireless communication schemes, the method including acquiring information about time durations for communicating using a first communication scheme and a second communication scheme, determining whether a time duration for communicating using the second communication scheme is within the predefined time, comparing a number of stored response messages to a threshold value based on a result of the determining, setting a number of response messages to be transmitted in a time duration for communicating using the first communication scheme based on a result of the comparing, and transmitting at least one response message using the first communication scheme based on setting of the number of response messages to be transmitted.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1B:
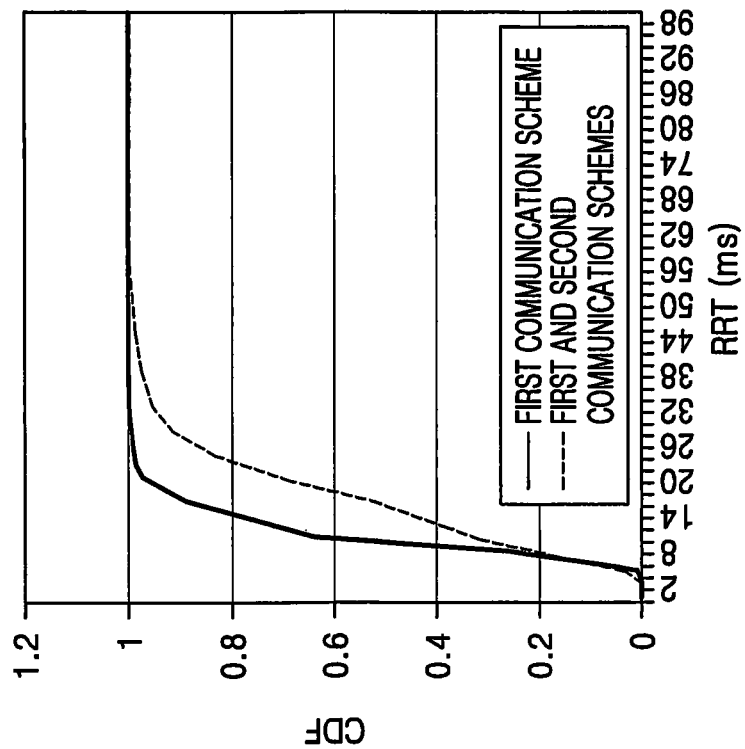
FIGS. 1A and 1B are graphs related to a communication speed of a device.
Figure 1A:
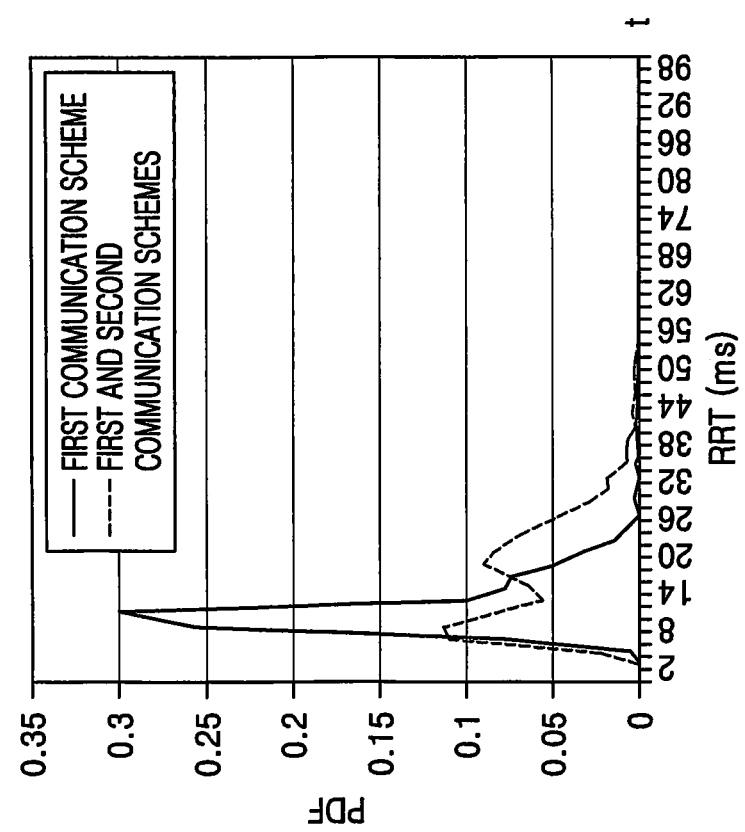

Reference will now be made in detail to various embodiments of the present disclosure, examples of which are illustrated in the accompanying drawings, wherein like reference numerals refer to like elements throughout. In this regard, the present disclosure may have different forms and should not be construed as being limited to the descriptions set forth herein. Accordingly, embodiments of the present disclosure are described below, by referring to the accompanying drawings, to merely explain aspects. As used herein, the term "and/or" includes any and all combinations of one or more of the associated listed items. An expression such as "at least one of," if preceding a list of elements, modifies the entire list of elements but does not modify the individual elements of the list.

The terms used in the present disclosure are those general terms currently widely used in the art, but the terms may vary according to the intention of those of ordinary skill in the art, precedents, or new technology in the art. Also, certain terms may be selected by the applicant, and in this case, the detailed meaning thereof will be described in the detailed description. Thus, the terms used in the present disclosure should be understood not as simple names but as being based on the meaning of the terms and the overall description.

Throughout the present disclosure, if it is described that a certain element is "connected" to another element, it should be understood that the certain element may be connected to another element directly or via another element in the middle. In addition, it will also be understood that if a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

Throughout the present disclosure, the term "device" may include a personal computer (PC), a cellular phone, a smartphone, a TV, a tablet PC, a laptop computer, a personal digital assistant (PDA), a portable multimedia player (PMP), a navigation machine, a moving picture experts group audio layer 3 (MP3) player, a digital camera, a refrigerator, a washing machine, a cleaner, and the like, but is not limited thereto, and may include various devices.

Throughout the present disclosure, a time sharing communication method of a plurality of communication schemes may include a communication method of dividing an overall time duration into partial time durations so as not to overlap each other and using different communication schemes for respective time durations. In addition, the meaning of simultaneously using a plurality of communication schemes or a method using a plurality of communication schemes together may also be analyzed the same as the time sharing communication method of a plurality of communication schemes.

Throughout the present disclosure, the term "server" may include a single server, a set of servers, a cloud server, and the like and may include service servers for providing services such as a voice over Internet protocol (VoIP) service and a content provision service. However, the server is not limited thereto.

The term "data segment" may include divided data. For example, the data segment may be a portion of a packet, a frame, or may be one packet or frame, but is not limited thereto.

The term "response message" may include a response to received data or an ACK message but is not limited thereto.

The term "communication scheme" may include all types of communication schemes such as communication schemes using predetermined communication standards, predetermined frequency bands, predetermined protocols, or predetermined channels. For example, communication schemes using Wi-Fi, Bluetooth, Bluetooth low energy (BLE), Zig-Bee, third generation (3G), long term evolution (LTE), near field communication (NFC), and ultrasound waves may be included, and all short-range communication schemes, long distance communication schemes, wireless communication schemes, and wired communication schemes may be included. However, the communication scheme is not limited thereto.

Short-range communication schemes may indicate communication schemes that enable communication only if two devices are within a predetermined range and may include, for example, Bluetooth, BLE, and NFC.

Long distance communication schemes may indicate communication schemes that enable communication between two devices regardless of a distance. For example, the long distance communication schemes may indicate schemes that enable communicating using a relay such as an access point (AP) even if two devices are spaced apart by a predetermined distance or more and may include communication schemes using cellular networks such as a short message service (SMS) network and a telephone network. The long distance communication schemes are not limited thereto and may include all communication schemes except for the short-range communication schemes.

Figure 2:
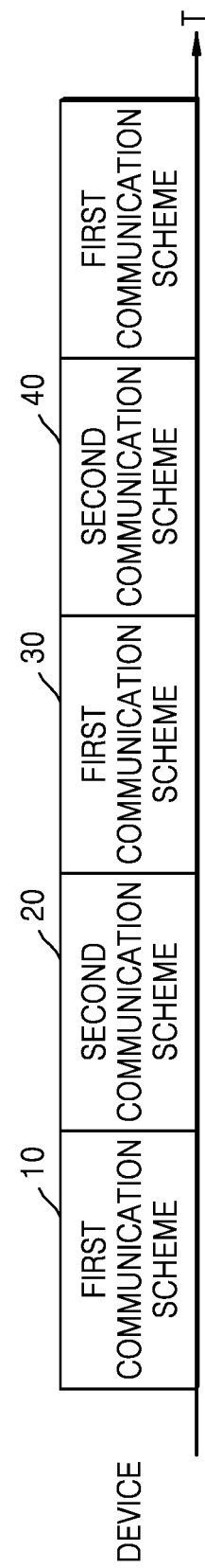
FIG. 2 illustrates a time sharing communication method according to an embodiment of the present disclosure.

FIG. 2 illustrates a time sharing communication method according to an embodiment of the present disclosure.

Referring to FIG. 2, a device may alternately communicate using a first communication scheme 10, 30, and 50 and a second communication scheme 20 and 40.

A device may use a plurality of communication schemes in a time sharing manner. That is, the device may perform communication during time durations for communicating using a first communication scheme and time durations for communicating using a second communication scheme, which are divided so as not to overlap each other. For example, a device may perform communicating using a first communication scheme from 1 second to 10 seconds and perform communicating using a second communication scheme from 10 seconds to 20 seconds.

A length of a time duration for communicating using a first communication scheme and a length of a time duration for communicating using a second communication scheme may be the same or different. In addition, the time durations for communicating using the first communication scheme and the time durations for communicating using the second communication scheme may be arranged alternately or changed in every predetermined period.

A device may use a first communication scheme, a second communication scheme, and a third communication scheme in a time sharing manner. A time duration for communicating using a first communication scheme, a time duration for communicating using a second communication scheme, and a time duration for communicating using a third communication scheme may be arranged sequentially or randomly. For example, the time duration for communicating using a first communication scheme, the time duration for communicating using a second communication scheme, and the time duration for communicating using a third communication scheme may be sequentially arranged, or the time duration for communicating using the first communication scheme, the time duration for communicating using the second communication scheme, the time duration for communicating using the first communication scheme, and the time duration for communicating using the third communication scheme may be sequentially arranged. However, the time sharing manner is not limited thereto.

The arrangement of time durations for communicating using respective communication schemes may be controlled by a device based on a state of a network or may be controlled by a separate external device.

Figure 3:
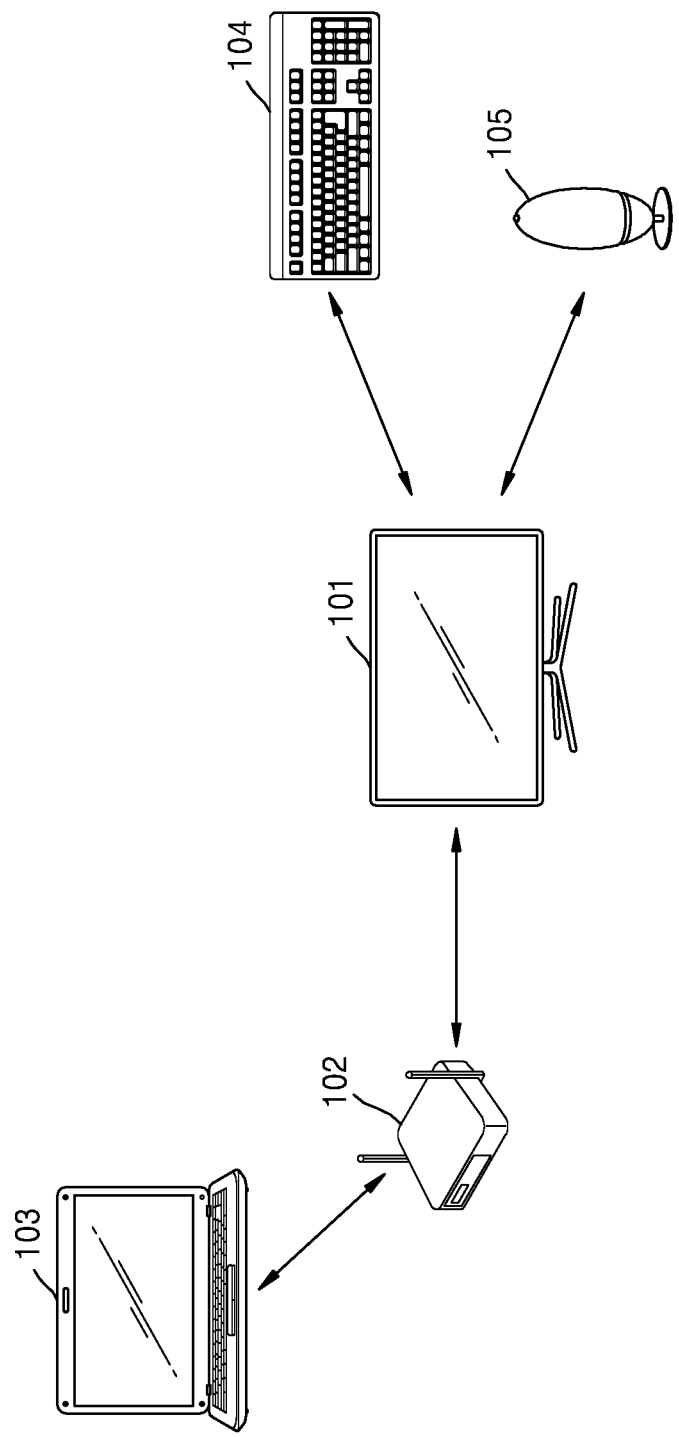
FIG. 3 illustrates a communication system for a device using a plurality of communication schemes, according to an embodiment of the present disclosure.

FIG. 3 illustrates a communication system for a device 101 using a plurality of communication schemes, according to an embodiment of the present disclosure.

Referring to FIG. 3, the device 101 may alternately communicate with a plurality of devices (103 using 105) by alternately using a first communication scheme and a second communication scheme. For example, the device 101 may communicate with a first external device 103 using a first communication scheme and communicate with a second external device 104 and a third external device 105 using a second communication scheme. Alternatively, the device 101 may communicate using only one of a first communication scheme and a second communication scheme.

The device 101 may use a first communication scheme and a second communication scheme in a time sharing manner by using one (or one set of) antenna(s). That is, the device 101 may communicate with the first external device 103 using a first communication scheme in a time duration for communicating using the first communication scheme and communicate with the second external device 104 or the third external device 105 using a second communication scheme in a time duration for communicating using the second communication scheme.

The first external device 103 may include a source device, a server, a content provider, or the like, but is not limited thereto. In addition, the second external device 104 and the third external device 105 may include a keyboard, a speaker, a remote control, a wearable device, or the like but is not limited thereto. In addition, a first communication scheme may be Wi-Fi, and a second communication scheme may be Bluetooth, BLE, or ZigBee, but the first communication scheme and the second communication scheme are not limited thereto.

The device 101 may receive a data segment from the first external device 103 and transmit a response message, using a first communication scheme. In addition, the device 101 may set a connection with the first external device 103 using a first communication scheme. However, the device 101 is not limited thereto.

The device 101 may connect with the first external device 103 by passing through an AP 102 using a first communication scheme. However, the device 101 may directly connect with the first external device 103.

In addition, the device 101 may control, transmit and receive data to and from, or search for the second external device 104 and the third external device 105 using a second communication scheme, but is not limited thereto.

The device 101 may receive a data segment from the first external device 103 using a first communication scheme. In addition, the device 101 may generate and store a response message to the received data segment. The device 101 may transmit, to the first external device 103, a predetermined number of response messages stored for a predetermined period.

However, if the device 101 uses a first communication scheme and a second communication scheme in a time sharing manner, the device 101 cannot transmit response messages as smoothly as if only the first communication scheme is used. If the device 101 does not smoothly transmit response messages, the first external device 103 may stop transmitting a data segment, and the communication speed may slow down.

Figure 4:
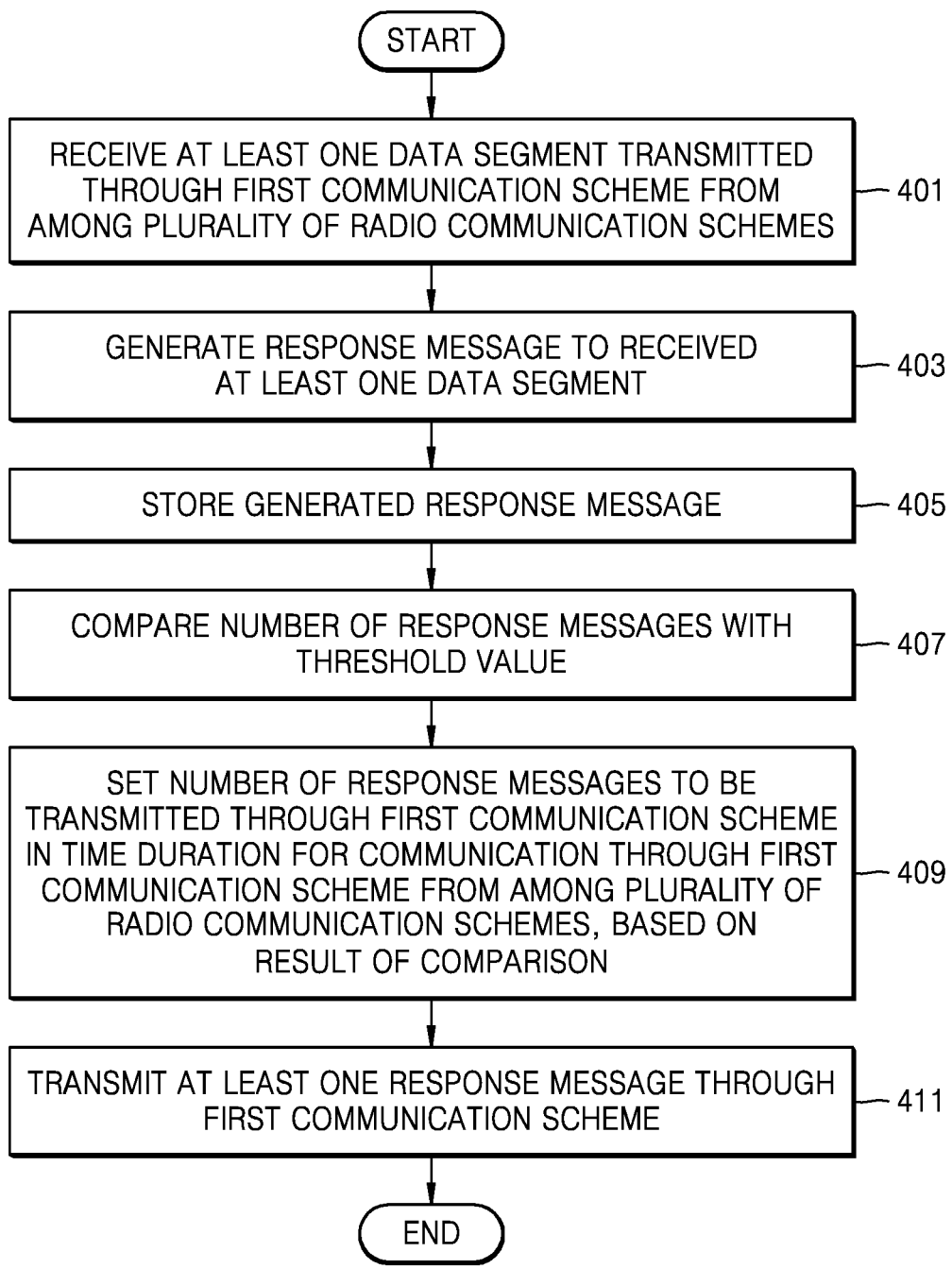
FIG. 4 is a flowchart of a communication method using a plurality of communication schemes, according to an embodiment of the present disclosure.

FIG. 4 is a flowchart of a communication method using a plurality of communication schemes, according to an embodiment of the present disclosure.

Referring to FIG. 4, in operation 401, a device may receive at least one data segment transmitted using a first communication scheme from among a plurality of wireless communication schemes. The device may receive at least one data segment from an external device in a time duration using the first communication scheme.

In operation 403, the device may generate a response message to the received at least one data segment. The device may generate a response message to each data segment or generate a response message to a plurality of data segments. In addition, the response message may include an ACK signal.

In operation 405, the device may store the generated response message. According to an embodiment of the present disclosure, the response message may be stored in a buffer or memory of the device.

In operation 407, the device may compare a number of stored response messages to a threshold value. According to an embodiment of the present disclosure, the threshold value may be a predetermined number or a predetermined data amount, but is not limited thereto. For example, the device may determine whether the number of stored response messages is 4 or more or determine whether a total date amount of stored response messages is 20 bits or more.

The device may acquire information about time durations for communicating using the first communication scheme and time durations for communicating using a second communication scheme and determine whether to compare the number of stored response messages to the threshold value, based on a time duration for communicating using the second communication scheme, which is allocated within a predefined time.

In operation 409, the device may set a number of response messages to be transmitted in a time duration for communicating using the first communication scheme from among the plurality of wireless communication schemes, based on a result of the comparison.

For example, if response messages corresponding to the threshold value or more are stored, the device may increase the number of response messages to be transmitted using the first communication scheme in a time duration for communicating using the first communication scheme for smooth communication.

The device may set the number of response messages to be transmitted with a highest priority in a time duration for communicating using the first communication scheme. The device may repetitively transmit and receive a data segment to and from an external device during a time duration for communicating using the first communication scheme.

However, if a certain number of response messages are not transmitted because of transmission and reception of other data, the reception of the data segment from the external device may stop. Therefore, the device may set, with the highest priority, an operation of transmitting a predetermined number of response messages if a time duration for communicating using the first communication scheme starts.

For example, the device may transmit and receive data segments to and from the external device during a time duration for communicating using the first communication scheme. However, the device may transmit a predetermined number of response messages before transmitting and receiving another data segment, thereby preventing the discontinuation of receiving a data segment due to non-transmission of a response message.

The device may set the number of response messages to be transmitted using the first communication scheme such that the number of response messages decreases in a time duration for communicating using the first communication scheme. That is, if the number of stored response messages is less than the threshold value, the device may decrease the set number of response messages to be transmitted.

In operation 411, the device may transmit at least one response message using the first communication scheme based on the determination in operation 409. A time duration for communicating using the first communication scheme may be set so as to be located between time durations for communicating using the second communication scheme. That is, the device may communicate with at least one external device by using the first communication scheme and the second communication scheme in a time sharing manner.

Figure 5:
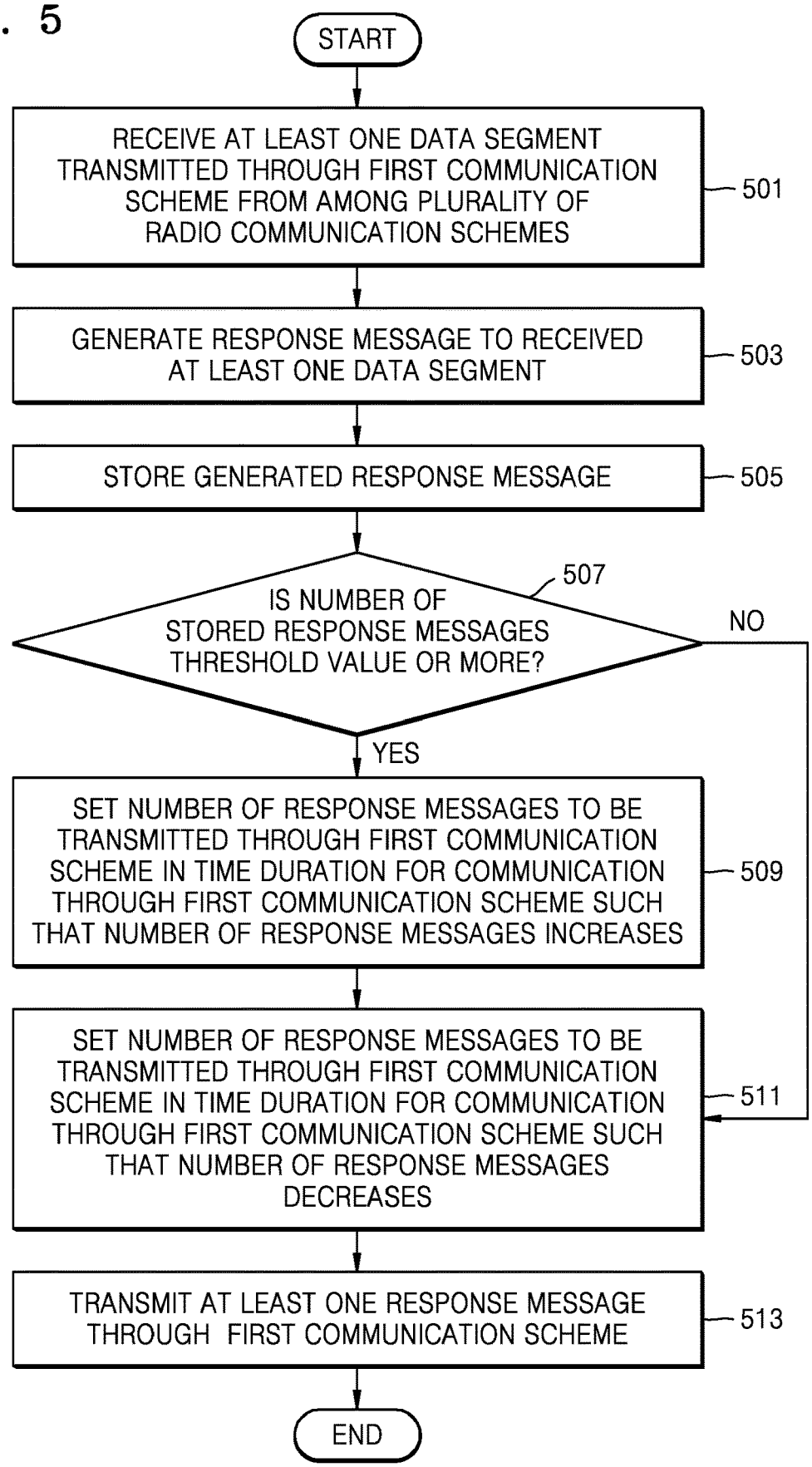
FIG. 5 is a flowchart of a method of determining a number of response messages to be transmitted using a first communication scheme, according to an embodiment of the present disclosure.

FIG. 5 is a flowchart of a method of determining a number of response messages to be transmitted using a first communication scheme, according to an embodiment of the present disclosure.

Referring to FIG. 5, in operation 501, a device may receive at least one data segment transmitted using the first communication scheme from among a plurality of wireless communication schemes.

In operation 503, the device may generate a response message to the received at least one data segment.

In operation 505, the device may store the generated response message. Since operations 501 through 505 correspond to the contents described above, a detailed description thereof is omitted.

In operation 507, the device may determine whether a number of stored response messages are equal to a threshold value or more. That is, the device may determine whether the number of buffered or stored response messages is equal to the threshold value or more and may determine the number of response messages to be transmitted using the first communication scheme, based on a result of the determination.

If the number of stored response messages is equal to the threshold value or more, in operation 509, the device may set a number of response messages to be transmitted in a time duration for communicating using the first communication scheme such that the number of response messages increases.

If the number of stored response messages is less than the threshold value, in operation 511, the device may set the number of response messages to be transmitted in a time duration for communicating using the first communication scheme such that the number of response messages decreases.

That is, the device adaptively adjusts the number of response messages to be transmitted using the first communication scheme according to whether the number of buffered response messages is equal to the threshold value or more or is less than the threshold value. In addition, the device may progressively increase or decrease the number of response messages to be transmitted, by comparing the number of response messages remaining after the transmission of response messages to the threshold value.

In operation 513, the device may transmit at least one response message using the first communication scheme. Since operation 513 corresponds to the contents described above, a detailed description thereof is omitted.

Figure 6:
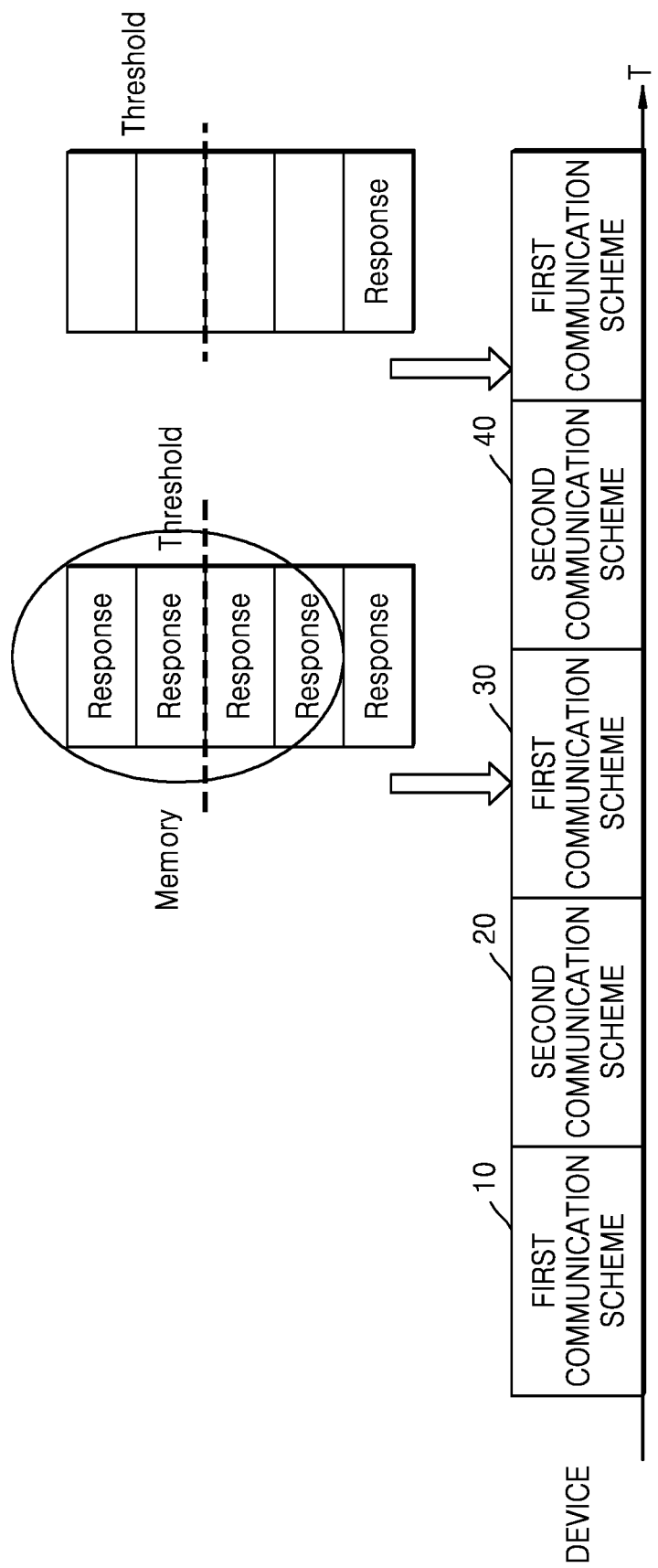
FIG. 6 illustrates a response message transmission method in a communication method using a plurality of communication schemes, according to an embodiment of the present disclosure.

FIG. 6 illustrates a response message transmission method in a communication method using a plurality of communication schemes, according to an embodiment of the present disclosure.

Referring to FIG. 6, a device may receive a data segment from a first external device in a first time duration 10 in which the first communication scheme is used and may generate a response message. In addition, the device may transmit two predefined response messages in the first time duration 10 in which the first communication scheme is used based on a predefined setting. Thereafter, the device may communicate with a second external device in a first time duration 20 in which the second communication scheme is used.

Time durations are configured by the first time duration 10 in which the first communication scheme is used, the first time duration 20 in which the second communication scheme is used, a second time duration 30 in which the first communication scheme is used, a second time duration 40 in which the second communication scheme is used, and a third time duration 50 in which the first communication scheme is used.

The device may compare the number of stored response messages to a threshold value. If the number of stored response messages exceeds the threshold value, the device may increase the number of response messages to be transmitted in the second time duration 30 in which the first communication scheme is used. The device may transmit four response messages in the second time duration 30 in which the first communication scheme is used.

The device may compare a number of response messages remaining after the transmission to the threshold. If the number of remaining response messages is equal to the threshold value or more as a result of the comparison, the device may increase the number of response messages to be transmitted in a next time duration in which the first communication scheme is used, and if the number of remaining response messages is less than the threshold value, the device may decrease the number of response messages to be transmitted in the next time duration in which the first communication scheme is used.

Figure 7:
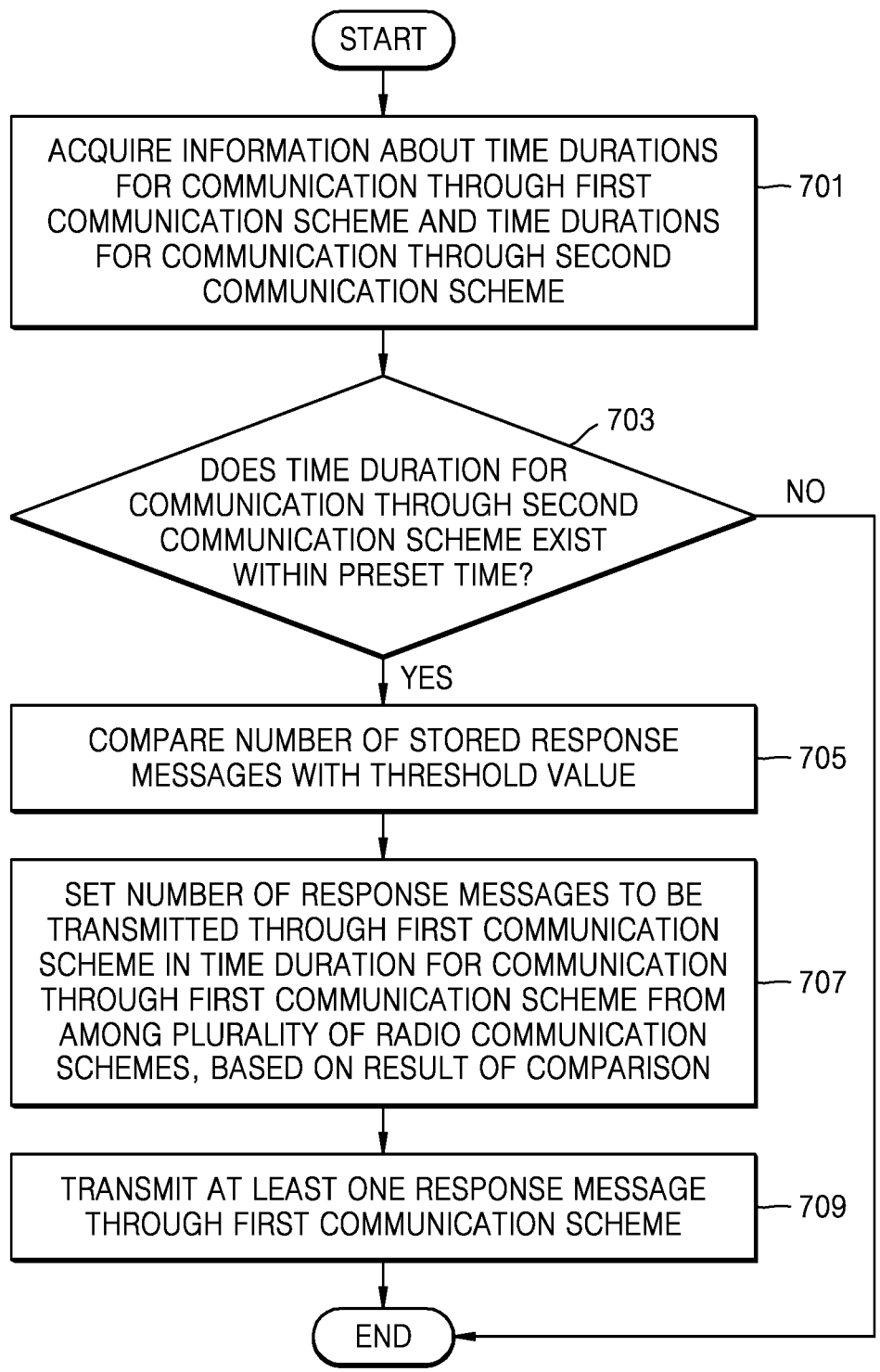
FIG. 7 is a flowchart of a communication method using a plurality of communication schemes, according to an embodiment of the present disclosure.

FIG. 7 is a flowchart of a communication method using a plurality of communication schemes, according to an embodiment of the present disclosure.

Referring to FIG. 7, in operation 701, a device may acquire information about time durations for communicating using the first communication scheme and time durations for communicating using the second communication scheme. For example, the device may acquire information about the existence, a length, and an arrangement of a time for communicating using the second communication scheme within a predefined time.

In operation 703, the device may determine whether a time duration for communicating using the second communication scheme is within the predefined time.

The device may acquire the information about the time durations for communicating using the first communication scheme and the time durations for communicating using the second communication scheme and determine whether to compare a number of stored response messages to a threshold value, based on a time duration for communicating using the second communication scheme, which is allocated within the predefined time.

For example, the device may compare the number of stored response messages to the threshold value if a time duration for communicating using the second communication scheme is allocated within the predefined time two times or more or if the length of the time duration for communicating using the second communication scheme is 2 seconds or more. That is, if the second communication scheme is not used or if communication is performed using the second communication scheme at a predetermined criterion or less, the device may not compare the number of stored response messages to the threshold value.

The device may determine whether to compare the number of stored response messages to the threshold value, according to a number of external devices communicating using the first communication scheme and a number of external devices communicating using the second communication scheme.

For example, if the number of external devices communicating using the first communication scheme is 2 or more or if the number of external devices communicating using the second communication scheme is 2 or more, the device may adaptively transmit response messages by comparing the number of stored response messages to the threshold value according to the number of communicating external devices.

The device may determine whether to compare the number of stored response messages to the threshold value, based on a type of a received data segment, quality of service (QoS) of the received data segment, and a current network bandwidth use status.

For example, if a data segment received from an external device using the first communication scheme is video streaming content, the device may adaptively transmit response messages by comparing the number of stored response messages to the threshold value for seamless content reproduction, but for a simple data download, the device may not perform an adaptive response message transmission method.

If a time duration for communicating using the second communication scheme is within the predefined time, in operation 705, the device may compare the number of stored response messages to the threshold value.

In operation 707, the device may set a number of response messages to be transmitted using the first communication scheme in a time duration for communicating using the first communication scheme from among a plurality of wireless communication schemes, based on a result of the comparison.

The device may set the number of response messages to be transmitted using the first communication scheme in a time duration for communicating using the first communication scheme from among the plurality of wireless communication schemes, based on a time duration for communicating using the second communication scheme, which is allocated within the predefined time.

That is, the device may increase the number of response messages to be transmitted with a highest priority in a time duration for communicating using the first communication scheme, in proportion to a length or the number of allocations of a time duration for communicating using the second communication scheme in a predefined time duration.

For example, if a time duration for communicating using the second communication scheme is allocated two times within a predetermined period and if the number of stored response messages is equal to the threshold value or more, the device may increase the number of response messages to be transmitted in a time duration for communicating using the first communication scheme from 2 to 4. However, if a time duration for communicating using the second communication scheme is allocated four times within the predetermined period and if the number of stored response messages is equal to the threshold value or more, the device may increase the number of response messages to be transmitted in a time duration for communicating using the first communication scheme from 2 to 6.

Alternatively, the device may decrease the number of response messages to be transmitted with the highest priority in a time duration for communicating using the first communication scheme, in proportion to a length or the number of allocations of a time duration for communicating using the second communication scheme in the predefined time duration.

In operation 709, the device may transmit at least one response message using the first communication scheme. Since operation 709 corresponds to the contents described above, a detailed description thereof is omitted.

Figure 8:
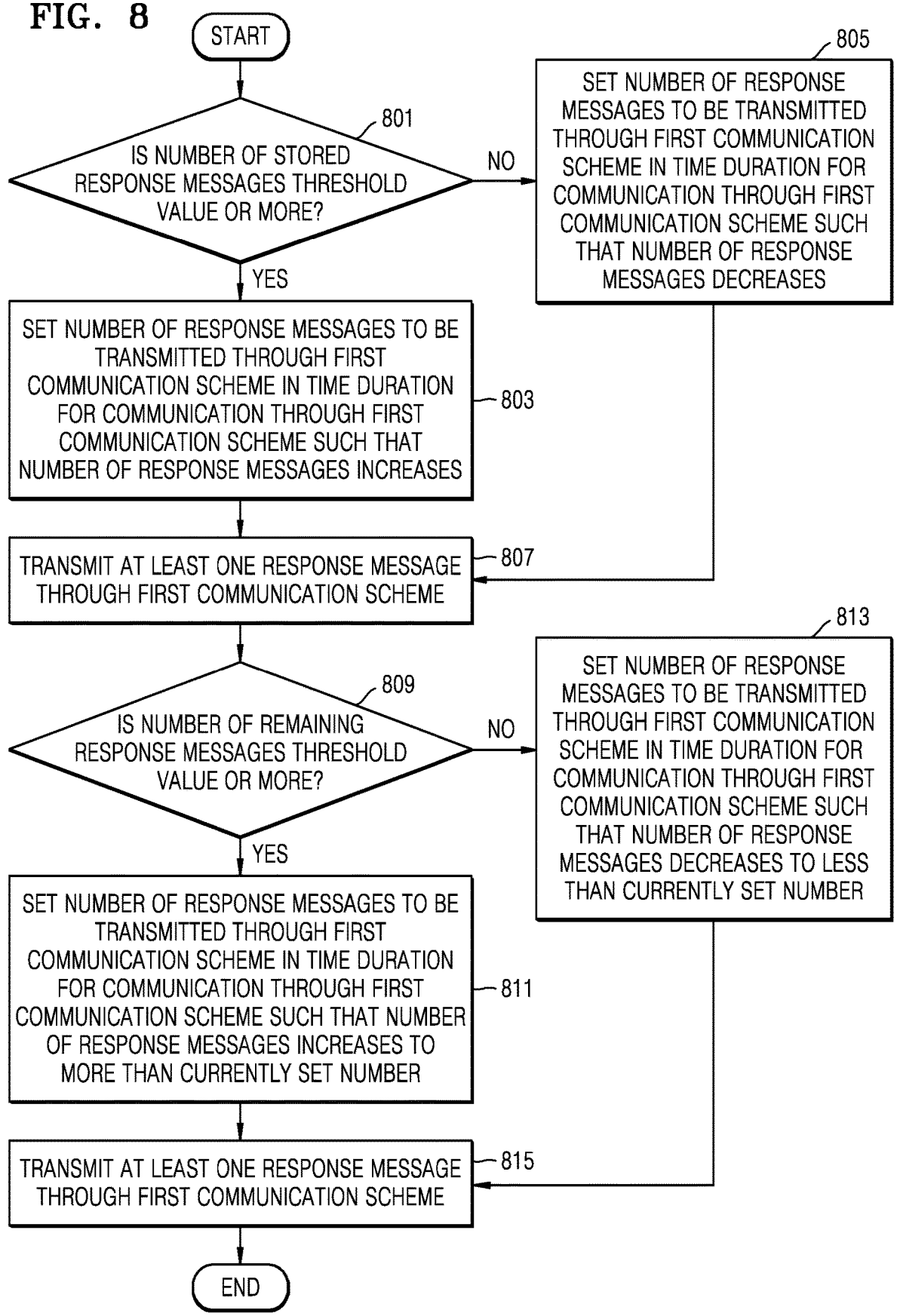
FIG. 8 is a flowchart of a method of determining a number of response messages to be transmitted using a first communication scheme, according to an embodiment of the present disclosure.

FIG. 8 is a flowchart of a method of determining a number of response messages to be transmitted using the first communication scheme, according to an embodiment of the present disclosure.

Referring to FIG. 8, in operation 801, a device may determine whether a number of stored response messages is equal to a threshold value or more. That is, as described above, if the device has determined that the adaptive response message transmission method is performed, the device may determine whether the number of stored response messages is equal to the threshold value or more.

Alternatively, operations 401 through 405 or operations 701 through 703 may be performed before operation 801.

If the number of stored response messages is equal to the threshold value or more, in operation 803, the device may set a number of response messages to be transmitted in a time duration for communicating using the first communication scheme such that the number of response messages increases.

If the number of stored response messages is less than the threshold value, in operation 805, the device may set the number of response messages to be transmitted in a time duration for communicating using the first communication scheme such that the number of response messages decreases. If the number of stored response messages is less than the threshold value, the device may not change the number of response messages to be transmitted in a time duration for communicating using the first communication scheme.

In operation 807, the device may transmit at least one response message using the first communication scheme. Since operation 807 corresponds to the contents described above, a detailed description thereof is omitted.

In operation 809, the device may determine whether a number of remaining response messages is equal to the threshold value or more. That is, the device may determine whether the number of residual response messages remaining after the transmission of the response messages in operation 807 is equal to the threshold value or more.

If the number of remaining response messages is equal to the threshold value or more, in operation 811, the device may set the number of response messages to be transmitted in a time duration for communicating using the first communication scheme such that the number of response messages increases to more than a currently set number.

The device may increase the number of response messages to be transmitted such that an increase amount is greater than the increase amount set in operation 803. For example, if the number of response messages to be transmitted was increased from 2 to 4 in operation 803, the number of response messages to be transmitted may be increased from 4 to 8 in operation 811.

That is, the device may determine an increase amount for increasing the number of response messages to be transmitted, in proportion to the number of comparisons of the number of response messages remaining after transmission of at least one response message to the threshold value.

If the number of remaining response messages is less than the threshold value, in operation 813, the device may set the number of response messages to be transmitted in a time duration for communicating using the first communication scheme such that the number of response messages decreases to less than the currently set number.

The device may decrease the number of response messages to be transmitted such that a decrease amount is greater than the decrease amount set in operation 805. For example, if the number of response messages to be transmitted was decreased from 8 to 6 in operation 805, the number of response messages to be transmitted may be decreased from 6 to 2 in operation 813.

That is, the device may determine a decrease amount for decreasing the number of response messages to be transmitted, in proportion to the number of comparisons of the number of response messages remaining after transmission of at least one response message to the threshold value.

In operation 815, the device may transmit at least one response message using the first communication scheme. Since operation 815 corresponds to the contents described above, a detailed description thereof is omitted.

Figure 9:
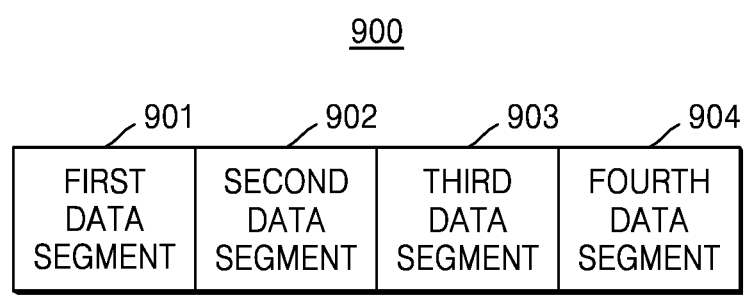
FIG. 9 illustrates dividing a data segment according to an embodiment of the present disclosure.

FIG. 9 illustrates dividing a data segment according to an embodiment of the present disclosure.

Referring to FIG. 9, first through fourth data segments 901 through 904 are obtained by dividing data 900 for transmission and may indicate one form of the data 900. For example, the data 900 may be a packet or a frame or may include non-packetized raw data, but is not limited thereto.

The first through fourth data segments 901 through 904 may include at least one header. For example, the first through fourth data segments 901 through 904 may a transmission control protocol (TCP) header, an Internet protocol (IP) header, a link layer protocol header, and the like.

A size of the first through fourth data segments 901 through 904 may vary depending on information about a network, which is acquired by a transmission device for transmitting data. For example, if no response messages are received from a reception device for receiving the data, the transmission device may reduce the size of first through fourth data segments 901 through 904. In addition, the transmission device may determine a size of a data segment based on RTT information.

If the reception device uses both the first communication scheme and the second communication scheme in a time sharing manner, response messages may not be smoothly transmitted to a device (for example, a server) for transmitting data using the first communication scheme. The device for transmitting data using the first communication scheme may determine that a bottleneck phenomenon has occurred and may not transmit a data segment or may transmit a data segment by reducing a size of the data segment, thereby decreasing a transmission rate. However, if the reception device adaptively adjusts response messages to be transmitted, the transmission device may increase a size of a data segment or may not stop transmitting the data segment, thereby preventing a decrease of the transmission rate.

Figure 10:
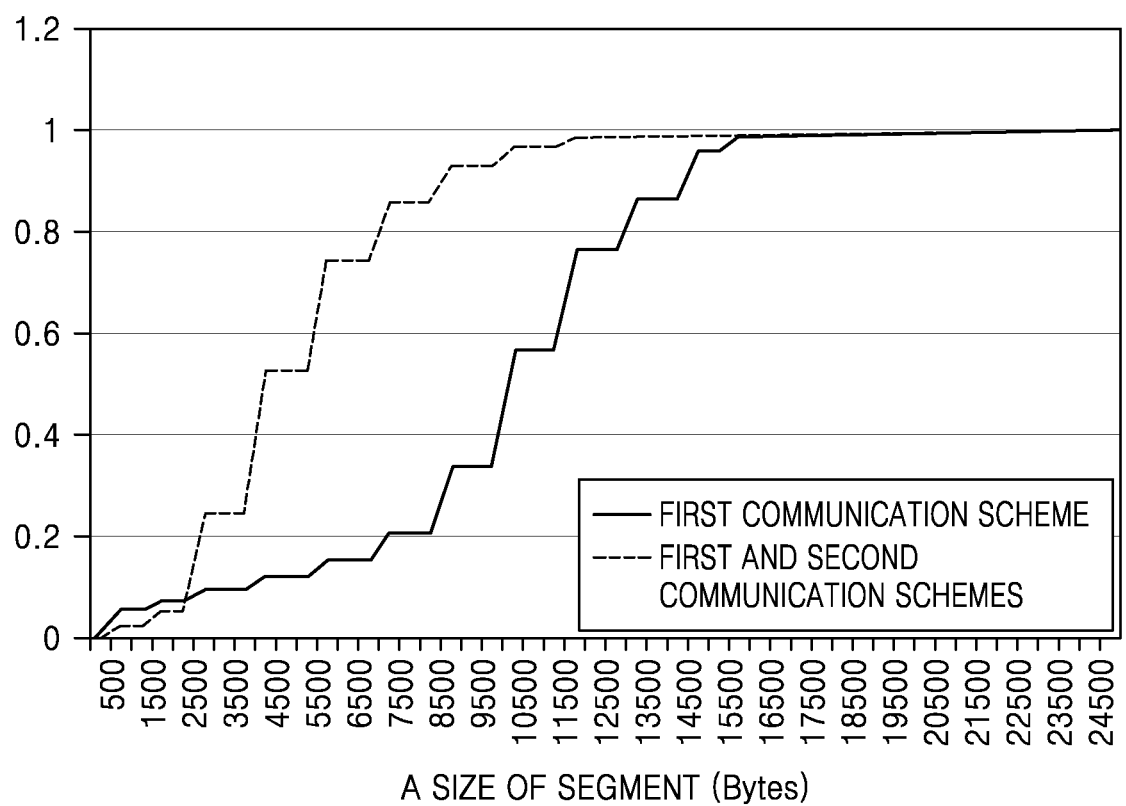
FIG. 10 is a graph of a change in a size of a data segment, according to an embodiment of the present disclosure.

FIG. 10 is a graph of a change in a size of a data segment, according to an embodiment of the present disclosure.

Referring to FIG. 10, a CDF of a size of a data segment received using the first communication scheme is illustrated. A size of a data segment received using the first communication scheme, if a device uses only the first communication scheme, is larger than a size of a data segment received using the first communication scheme, if the device uses the first communication scheme and the second communication scheme in a time sharing manner.

That is, as described above, if the device uses the first communication scheme and the second communication scheme in a time sharing manner, a size of a received data segment may be small.

If a transmission device for transmitting data determines that a network state is not good so that response messages cannot be received, a size of a data segment may be reduced, and thus a reception device may transmit response messages of a number corresponding to a number of received data segments to the transmission device by adaptively transmitting response messages, thereby maintaining a size of a data segment within a predetermined range.

Therefore, if the device transmits at least one response message, the device may receive a data segment of a greater size than a size of a previously received data segment, in response to the transmission.

Figure 11:
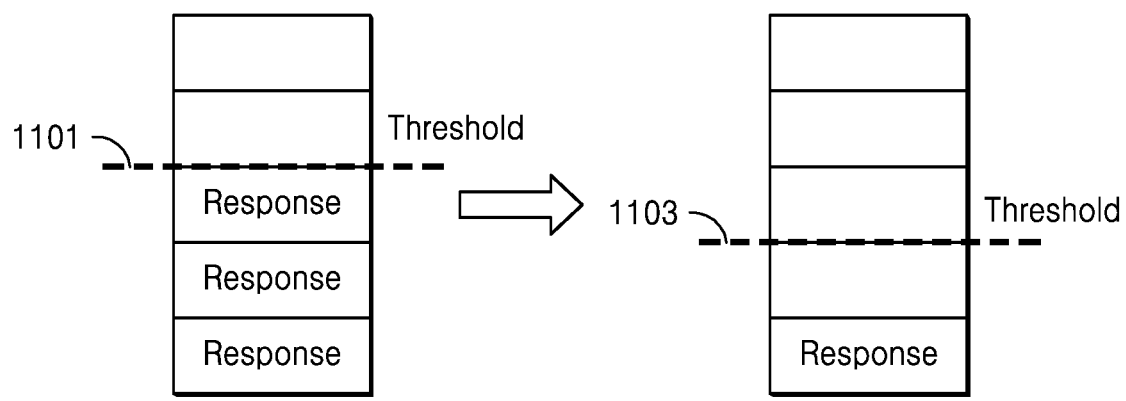
FIG. 11 illustrates a method of adjusting a threshold value for a number of stored response messages, according to an embodiment of the present disclosure.

FIG. 11 illustrates a method of adjusting a threshold value 1101 for a number of stored response messages, according to an embodiment of the present disclosure.

Referring to FIG. 11, a device may adjust the threshold value 1101 for adaptive transmission of response messages. The threshold value 1101 may be adjusted by an input of a user or a control from an external device or may be adjusted according to a speed or a state of a network.

The device may change the threshold value 1101 according to a type of a data segment. For example, if reception of a data segment is important as in a streaming service, the device may set the threshold value 1101 to be high.

The device may adjust the threshold value 1101 according to a number of external devices communicating using the first communication scheme and a number of external devices communicating using the second communication scheme. For example, the device may set the threshold value 1101 to 4 if a number of external devices communicating using the first communication scheme are 3 or more, and set the threshold value 1103 to 3 if a number of external devices communicating using the second communication scheme are 3 or more. The device may adjust the threshold value according to a number of wireless communication schemes used in a time sharing manner by the device. For example, if the device uses two communication schemes such as Bluetooth and Wi-Fi in a time sharing manner, the device may set the threshold value to 2, and if the device uses three communication schemes such as Bluetooth, ZigBee, and Wi-Fi in a time sharing manner, the device may set the threshold value to 3.

Figure 12:
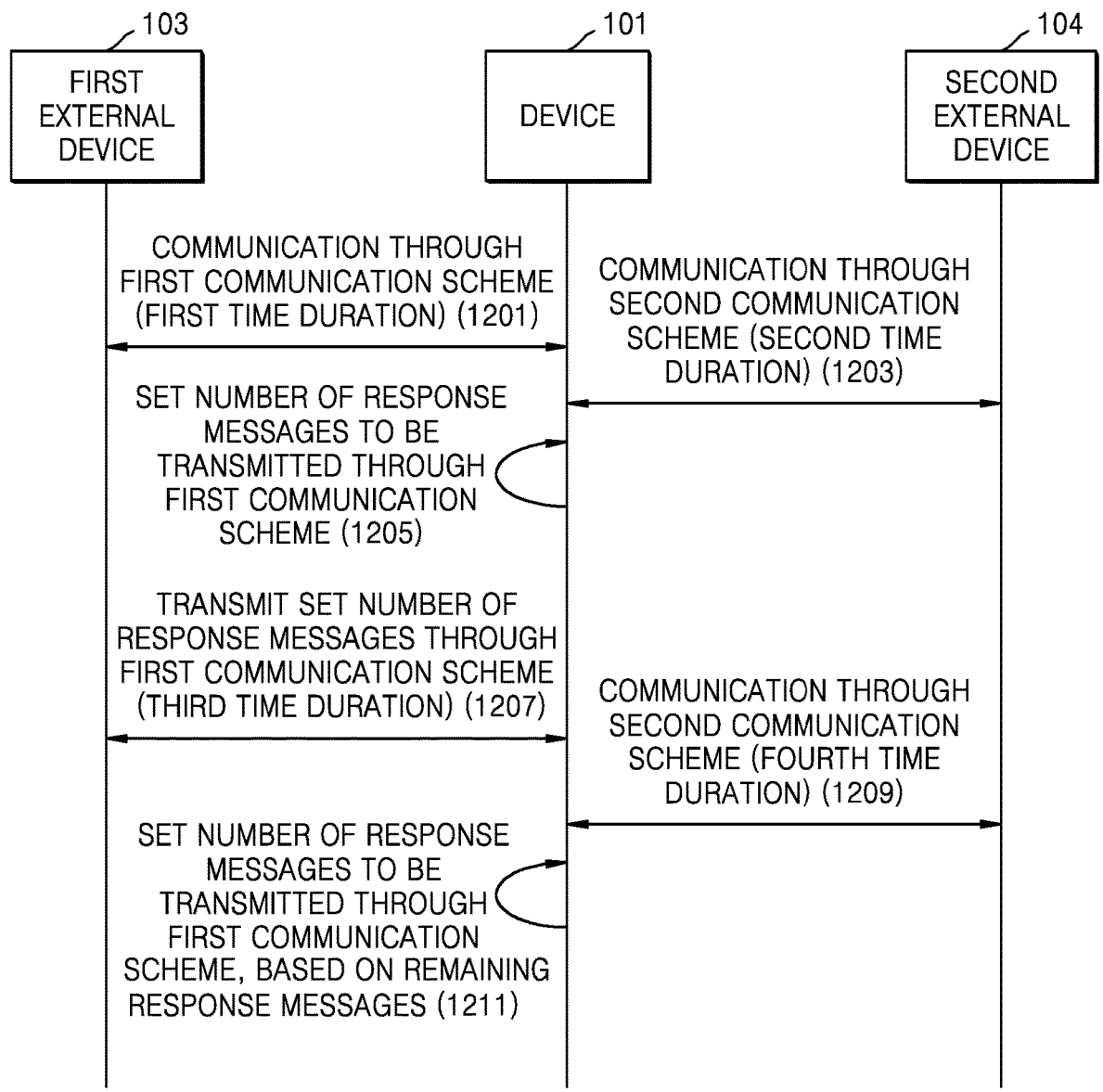
FIG. 12 is a signaling diagram of a communication method for a device using a plurality of communication schemes, according to an embodiment of the present disclosure.

FIG. 12 is a signaling diagram of a communication method for the device 101 using a plurality of communication schemes, according to an embodiment of the present disclosure.

Referring to FIG. 12, in operation 1201, the device 101 may communicate with the first external device 103 using the first communication scheme during a first time duration. The device 101 may receive a data segment from the first external device 103 using the first communication scheme during the first time duration and transmit a response message or a data segment.

In operation 1203, the device 101 may communicate with the second external device 104 using the second communication scheme during a second time duration.

In operation 1205, the device 101 may determine a number of response messages to be transmitted using the first communication scheme. Since a method of setting the number of response messages to be transmitted corresponds to the contents described with reference to FIGS. 4 through 8 described above, a detailed description thereof is omitted. That is, the device 101 may set the number of response messages to be transmitted in a next time duration (e.g. a third time duration) for communicating using the first communication scheme.

In operation 1207, the device 101 may transmit the response messages set in operation 1205 to the first external device 103, using the first communication scheme during the third time duration. The device 101 may further communicate with the first external device 103 using the first communication scheme. That is, the device 101 may transmit at least one response message to the first external device 103 with a highest priority based on the setting in operation 1205 after the third time duration starts, and thereafter if there is a remaining time, the device 101 may transmit and receive an additional data segment to and from the first external device 103 or transmit additional response messages to the first external device 103.

In operation 1209, the device 101 may communicate with the second external device 104 using the second communication scheme during a fourth time duration.

In operation 1211, the device 101 may determine a number of response messages to be transmitted using the first communication scheme, based on residual response messages. That is, the device 101 may set a number of response messages to be transmitted in a next time duration (for example, a fifth time duration). Since operation 1211 corresponds to the contents described above, a detailed description thereof is omitted.

Figure 13:
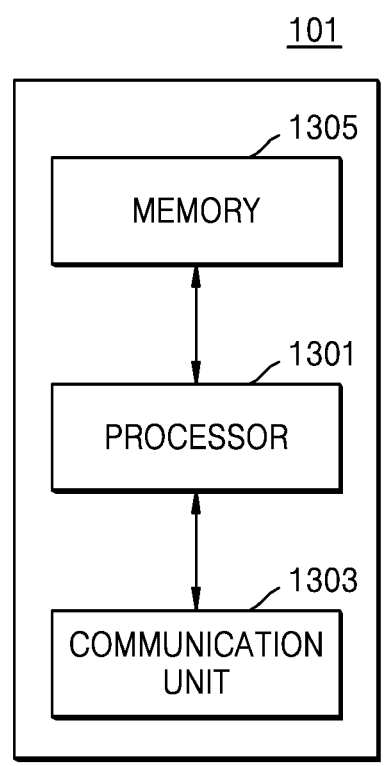
FIG. 13 is a block diagram of a device using a plurality of communication schemes, according to an embodiment of the present disclosure.

FIG. 13 is a block diagram of the device 101 using a plurality of communication schemes, according to an embodiment of the present disclosure.

Referring to FIG. 13, the device 101 using a plurality of communication schemes according to an embodiment of the present disclosure may include a processor 1301, a communication unit 1303, and a memory 1305. However, the components shown in FIG. 13 are not all requisite components of the device 101. The device 101 may be implemented by more or less components than the components shown in FIG. 13.

The processor 1301 commonly controls the general operation of the device 101. For example, the processor 1301 may generally control the components included in the device 101 by executing programs stored in the device 101.

The processor 1301 may compare a number of stored response messages to a threshold value and set a number of response messages to be transmitted in a time duration for communicating using the first communication scheme from among a plurality of wireless communication schemes, based on a result of the comparison.

The processor 1301 may acquire information about time durations for communicating using the first communication scheme and time durations for communicating using the second communication scheme and determine whether to compare the number of stored response messages to the threshold value, based on a time duration for communicating using the second communication scheme, which is allocated within a predefined time. In addition, the processor 1301 may set the number of response messages to be transmitted in a time duration using the first communication scheme from among the plurality of wireless communication schemes, based on a time duration for communicating using the second communication scheme, which is allocated within the predefined time.

The processor 1301 may set the number of response messages to be transmitted using the first communication scheme such that the number of response messages increases if the number of stored response messages is equal to the threshold value or more and may set the number of response messages to be transmitted using the first communication scheme such that the number of response messages decreases if the number of stored response messages is less than the threshold value.

The processor 1301 may acquire RTT information by transmitting a predetermined data segment and compare the number of stored response messages to the threshold value based on the acquired RTT information.

The communication unit 1303 may perform communication by using a plurality of wireless communication schemes. The communication unit 1303 may receive at least one data segment transmitted using the first communication scheme and generate a response message to the received at least one data segment. In addition, the communication unit 1303 may transmit a set number of response messages using the first communication scheme.

The communication unit 1303 may transmit response messages of a number set by the processor 1301, with a highest priority in a time duration for communicating using the first communication scheme.

The memory 1305 may store a generated response message. The memory 1305 may include a buffer.

A time duration for communicating using the first communication scheme may be set to be located between time durations for communicating using the second communication scheme.

Figure 14:
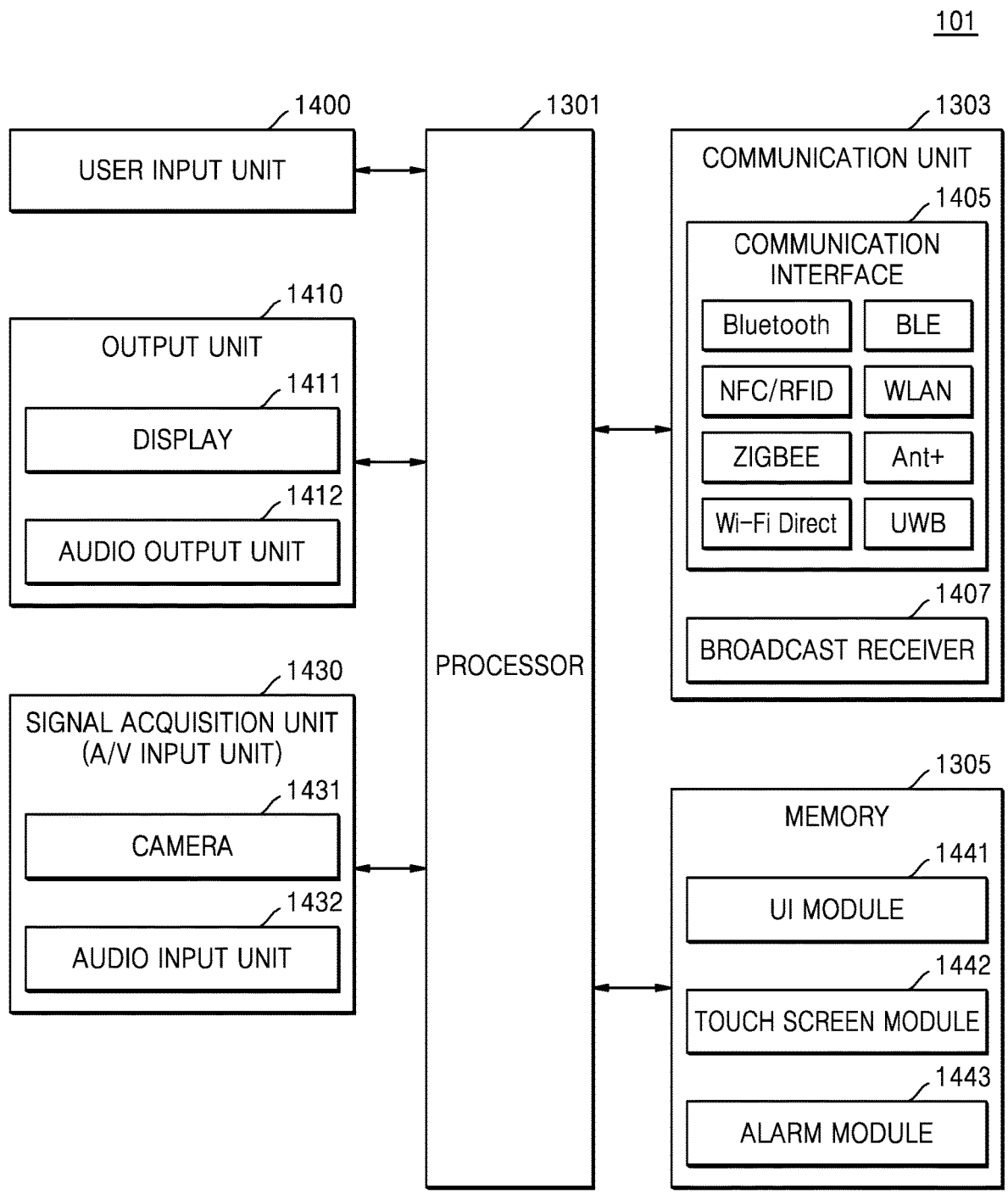
FIG. 14 is a block diagram of a device using a plurality of communication schemes, according to an embodiment of the present disclosure.

FIG. 14 is a block diagram of the device 101 using a plurality of communication schemes, according to an embodiment of the present disclosure.

Referring to FIG. 14, the device 101 using a plurality of communication schemes may include a user input unit 1400, an output unit 1410, and a signal acquisition unit (audio/video (A/V) input unit) 1430 in addition to the processor 1301, the communication unit 1303, and the memory 1305. However, the components shown in FIG. 14 are not all requisite components of the device 101. The device 101 may be implemented by more or less components than the components shown in FIG. 14.

Since an operation of the processor 1301 corresponds to the contents described above, a detailed description thereof is omitted.

The communication unit 1303 may include a communication interface 1405 and a broadcast receiver 1407. The communication interface 1405 may include a Bluetooth communication interface, a BLE communication interface, an NFC/radio frequency identification (RFID) communication interface, a wireless local area network (WLAN) (e.g. Wi-Fi) communication interface, a ZigBee communication interface, an Infrared Data Association (IrDA) communication interface, a Wi-Fi Direct (WFD) communication interface, an ultra-wideband (UWB) communication interface, an Ant+ communication interface, and the like, but is not limited thereto.

The broadcast receiver 1407 receives an externally broadcast signal and/or broadcast related information through a broadcast channel. The broadcast channel may include satellite channels and terrestrial channels. The device 101 may not include the broadcast receiver 1407.

The device 101 may further include a mobile communication interface. The mobile communication interface transmits and receives a wireless signal to and from at least one of a base station, an external terminal, and a server in a mobile communication network. The wireless signal may include a voice call signal, a video call signal, or various types of data according to transmission and reception of a text/multimedia message. Since an operation of the communication unit 1303 corresponds to the contents described above, a detailed description thereof is omitted.

The memory 1305 may store programs for processing and controlling of the processor 1301 or the communication unit 1303 and store data input to the device 101 and output from the device 101.

The memory 1305 may include at least one type of storage media from among a flash memory type memory, a hard disk type memory, a multimedia card micro type memory, a card type memory (for example, a secure digital (SD) or extreme digital (XD) memory), random access memory (RAM), static RAM (SRAM), read-only memory (ROM), electrically erasable programmable ROM (EEPROM), programmable ROM (PROM), a magnetic memory, a magnetic disc, and an optical disc. Furthermore, the memory 1305 may include a user interface (UI) module 1441, a touch screen module 1442, and an alarm module 1443.

The user input unit 1400 indicates a means for inputting, by a user, data for controlling the device 101. Examples of the user input unit 1400 may include a keypad, a dome switch, a touch pad (e.g., a capacitive scheme, a resistive overlay scheme, an infrared beam scheme, or a surface acoustic wave (SAW) scheme, an integral strain gauge scheme, a piezoelectric scheme, and the like), a jog wheel, and a jog switch, but are not limited thereto.

The output unit 1410 may output an audio signal, a video signal, or a haptic (e.g. vibration) signal and may include a display 1411 and an audio output unit 1412. The display 1411 displays and outputs information processed by the device 101.

If the display 1411 and a touch pad form a layer structure to configure a touch screen, the display 1411 may be used as not only an output device but also as an input device. The display 1411 may include at least one of a liquid crystal display, a thin-film transistor liquid crystal display, an organic light-emitting diode display, a flexible display, a three-dimensional (3D) display, and an electrophoretic display. The device 101 may include two or more displays 1411 according to an implementation form of the device 101. The two or more displays 1411 may be disposed to face each other by using a hinge.

The audio output unit 1412 may output audio data received through the communication unit 1303 or stored in the memory 1305. In addition, the audio output unit 1412 may output an audio signal related to a function performed by the device 101. The audio output unit 1412 may include a speaker, a buzzer, and the like.

In addition, the output unit 1410 may include a vibration motor. The vibration motor may output a vibration signal.

For example, the vibration motor may output a vibration signal corresponding to an output of audio data or video data.

In addition, the output unit 1410 may include a sensor module. The sensor module may detect a state of the device 101 or an ambient state of the device 101 and transmit the detected information to the processor 1301.

The sensor module may include at least one of a magnetic sensor, an acceleration sensor, a temperature/humidity sensor, an infrared (IR) sensor, a gyroscope sensor, a position sensor (for example, a global positioning system (GPS)), an atmospheric pressure sensor, a proximity sensor, and a color sensor (e.g. a red-green-blue sensor (RGB)), but is not limited thereto. A function of each sensor may be intuitively inferred by those of ordinary skill in the art from a name thereof, and thus a detailed description thereof is omitted herein.

The signal acquisition unit (A/V input unit) 1430 is to input an audio signal or a video signal and may include a camera 1431, an audio input unit 1432, and the like. The camera 1431 may obtain an image frame of a still image, a moving picture, or the like through an image sensor in a video call mode or a capturing mode. An image captured through the image sensor may be processed by the processor 1301 or a separate image processing unit.

The image frame processed by the camera 1431 may be stored in the memory 1305 or transmitted externally through the communication unit 1303. Two or more cameras 1431 may be provided depending on an implementation form of the device 101.

The audio input unit 1432 may receive an external audio signal and convert the external audio signal to electrical voice data. The audio input unit 1432 may be a microphone, but is not limited thereto.

The audio input unit 1432 may receive an audio signal from an external device, a server, or a user. The audio input unit 1432 may use various noise cancellation algorithms to cancel noise generated during a process of receiving an external audio signal.

A processor, a memory for storing and executing program data, a permanent storage such as a disk drive, a communication port for performing communication with an external device, and a user interface, such as a communication port for communicating with an external device, a touch panel, a key, and a button. Methods implemented with a software module or an algorithm may be stored in a non-transitory computer-readable recording medium in the form of computer-readable code or program instructions executable in the processor. Examples of a non-transitory computer-readable recording medium include magnetic storage media (e.g., ROM, RAM, floppy disks, hard disks, etc.) and optical recording media (e.g., CD-ROMs, digital versatile discs (DVDs), etc.). The non-transitory computer-readable recording medium may also be distributed over network coupled computer systems so that the computer-readable code may be stored and executed in a distributed fashion. The media may be read by a computer, stored in the memory, and executed by the processor.

For the understanding of the embodiments of the present disclosure, reference numerals are disclosed in the embodiments shown in the accompanying drawings, and certain terms are used to describe the embodiments. However, the present disclosure is not intended to be limited by the certain terms, and the present disclosure may include all components, which may be known by those of ordinary skill in the art.

The embodiments of the present disclosure may be represented with functional blocks and various processing steps. These functional blocks may be implemented by various numbers of hardware and/or software configurations for executing certain functions. For example, the embodiments of the present disclosure may adopt direct circuit configurations, such as memory, processing, logic, and lookup tables, for executing various functions under control of one or more processors or by other control devices. Like components of the embodiments of the present disclosure may be able to execute the various functions with software programming or software elements, and may be implemented by a programming or scripting language, such as C, C++, Java, or assembler, with various algorithms implemented by a combination of a data structure, processes, routines, and/or other programming components. Functional aspects may be implemented with algorithms executed in one or more processors. In addition, the embodiments of the present disclosure may adopt the prior art for electronic environment setup, signal processing and/or data processing. Terms, such as "mechanism," "element," "means," and "configuration," may be widely used and are not delimited as mechanical and physical configurations. The terms may include the meaning of a series of routines of software in association with a processor.

Certain executions described in the embodiments of the present disclosure are not intended to limit the scope of the present disclosure. For conciseness of the present disclosure, disclosure of conventional electronic configurations, control systems, software, and other functional aspects of the systems may be omitted. In addition, connections or connection members of lines between components shown in the accompanying drawings illustrate functional connections and/or physical or circuit connections, and the connections or connection members may be represented by replaceable or additional various functional connections, physical connections, or circuit connections in an actual apparatus. In addition, if there is no concrete use of terms such as "requisite" or "important" to refer to a component, that component may not be necessarily required for application of the embodiments of the present disclosure.

The use of the term "said" or a similar directional term in the present disclosure (in particular, in the appended claims) may correspond to both the singular and the plural. In addition, if a range is disclosed, individual values belonging to the range are included (if there is no disclosure opposed to this), and this is the same as if each of the individual values forming the range is disclosed in the detailed description of the present disclosure. Finally, for steps forming the methods, if an order is not clearly disclosed or, if there is no disclosure opposed to the clear order, the steps may be performed in any order deemed proper. The methods are not necessarily limited to the disclosed order of the steps. The use of all illustrations or illustrative terms (for example, and so forth, etc.) is simply to describe the present disclosure in detail, and the scope of the present disclosure is not limited due to the illustrations or illustrative terms unless they are limited by the appended claims. In addition, it will be understood by those of ordinary skill in the art that various modifications, combinations, and changes may be formed according to design conditions and factors within the scope of the present disclosure as defined by the appended claims and the equivalents.

The embodiments of the present disclosure provide a method of minimizing a decrease in a communication speed even while using a plurality of communication schemes in a single device.

Embodiments of the present disclosure described herein are intended to be considered in a descriptive sense only and are not intended for purposes of limitation. Descriptions of features or aspects within each embodiment of the present disclosure are intended to be considered as available for other similar features or aspects in other embodiments of the present disclosure.

While one or more embodiments of the present disclosure have been described with reference to the accompanying drawings, it will be understood by those of ordinary skill in the art that various changes in form and details may be made therein without departing from the scope of the present disclosure as defined by the appended claims and their equivalents.

What is claimed is:

1. A communication method using a plurality of wireless communication schemes, the communication method comprising:
   acquiring information about time durations for communicating using a first communication scheme and a second communication scheme;
   determining whether a time duration for communicating using the second communication scheme is within a predefined time;
   comparing a number of stored response messages to a threshold value based on a result of the determining;
   setting a number of response messages to be transmitted in a time duration for communicating using the first communication scheme based on a result of the comparing; and
   transmitting at least one response message using the first communication scheme based on setting of the number of response messages to be transmitted.

2. The method of claim 1, further comprising:
   determining the threshold value based on at least one of a type of a data segment transmitted using the first communication scheme or the second communication scheme, a state of a network, a number of external devices communicating using the first communication scheme or a number of external devices communicating using the second communication scheme.

3. The method of claim 2, further comprising:
   adjusting the determined threshold value based on at least one a type of a data segment transmitted using the first communication scheme or the second communication scheme, a state of a network, a number of external devices communicating using the first communication scheme or a number of external devices communicating using the second communication scheme.

4. The method of claim 1, further comprising:
   receiving at least one data segment transmitted using the first communication scheme;
   generating a response message for the received at least one data segment; and
   storing the generated response message.

5. The method of claim 1, wherein the time duration for communicating using the first communication scheme is set to be located between time durations for communicating using a second communication scheme.

6. The method of claim 1, wherein information about time durations for communicating using the first communication scheme and the second communication scheme comprises at least one of an existence, a length, and an arrangement of a time for communicating using the second communication scheme within a predefined time.

7. The method of claim 1, wherein setting the number of response messages to be transmitted comprises:
   setting the number of response messages to be transmitted in a time duration for communicating using the first communication scheme from among the plurality of wireless communication schemes such that the number of response messages increases if a number of stored response messages is equal to or greater than the threshold value; and
   setting the number of response messages to be transmitted in a time duration for communicating using the first communication scheme from among the plurality of wireless communication schemes such that the number of response messages decreases if the number of stored response messages is less than the threshold value.

8. The method of claim 1, further comprising:
   comparing a number of response messages remaining after transmission of the at least one response message to the threshold value;
   setting the number of response messages to be transmitted in a time duration for communicating using the first communication scheme such that the number of response messages increases to more than a currently set number if the number of response messages remaining after the transmission is equal to or greater than the threshold value; and
   setting the number of response messages to be transmitted in a time duration for communicating using the first communication scheme from among the plurality of wireless communication schemes such that the number of response messages decreases to the currently set number if the number of response messages remaining after the transmission is less than the threshold value.

9. The method of claim 1, wherein the number of response messages is transmitted with a highest priority in a time duration for communicating using the first communication scheme.

10. The method of claim 1, wherein the response message comprises an acknowledgement (ACK) message and the first communication scheme comprises a wireless fidelity (Wi-Fi) communication scheme and the second communication scheme comprises at least one of Bluetooth®, Bluetooth Low Energy (BLE), or ZigBee® scheme.

11. A device using a plurality of wireless communication schemes, the device comprising:
    a communication interface;
    a memory storing one or more instructions; and
    a processor coupled with the communication interface and the memory and configured to:
    acquire information about time durations for communicating using a first communication scheme and a second communication scheme;
    determine whether a time duration for communicating using the second communication scheme is within a predefined time;
    compare a number of stored response messages to a threshold value based on the determination result;
    set a number of response messages to be transmitted in a time duration for communicating using the first communication scheme based on a result of the comparing; and
    transmit at least one response message using the first communication scheme based on setting of the number of response messages to be transmitted.

12. The device of claim 11, wherein the processor is further configured to:
    determine the threshold value based on at least one of a type of a data segment transmitted using the first communication scheme or the second communication scheme, a state of a network, a number of external devices communicating using the first communication scheme or a number of external devices communicating using the second communication scheme.

13. The device of claim 12, wherein the processor is further configured to:
adjust the determined threshold value based on at least one of a type of a data segment transmitted using the first communication scheme or the second communication scheme, a state of a network, a number of external devices communicating using the first communication scheme or a number of external devices communicating using the second communication scheme.

14. The device of claim 11, wherein the processor is further configured to:
receive at least one data segment transmitted using the first communication scheme;
generate a response message for the received at least one data segment; and
store the generated response message.

15. The device of claim 11, wherein the time duration for communicating using the first communication scheme is set to be located between time durations for communicating using the second communication scheme.

16. The device of claim 11, wherein information about time durations for communicating using a first communication scheme and a second communication scheme comprises at least one of an existence, a length, and an arrangement of a time for communicating using the second communication scheme within the predefined time.

17. The device of claim 11, wherein the processor is further configured to:
set the number of response messages to be transmitted in a time duration for communicating using the first communication scheme from among the plurality of wireless communication schemes such that the number of response messages increases if the number of stored response messages is equal to or greater than the threshold value; and
set the number of response messages to be transmitted in a time duration for communicating using the first communication scheme from among the plurality of wireless communication schemes such that the number of response messages decreases if the number of stored response messages is less than the threshold value.

18. The device of claim 11, wherein the processor is further configured to:
compare a number of response messages remaining after transmission of the at least one response message to the threshold value;
set the number of response messages to be transmitted in a time duration for communicating using the first communication scheme such that the number of response messages increases to more than a currently set number if the number of response messages remaining after the transmission is equal to or greater than the threshold value; and
set the number of response messages to be transmitted in a time duration for communicating using the first communication scheme from among the plurality of wireless communication schemes such that the number of response messages decreases to the currently set number if the number of response messages remaining after the transmission is less than the threshold value.

19. The device of claim 11, wherein the number of response messages are transmitted with a highest priority in a time duration for communicating using the first communication scheme.

20. A non-transitory computer-readable recording medium having recorded a program for implementing a method using a plurality of wireless communication schemes, the method comprising:
acquiring information about time durations for communicating using a first communication scheme and a second communication scheme;
determining whether a time duration for communicating using the second communication scheme is within a predefined time;
comparing a number of stored response messages to a threshold value based on a result of the determining;
setting a number of response messages to be transmitted in a time duration for communicating using the first communication scheme based on a result of the comparing; and
transmitting at least one response message using the first communication scheme based on setting of the number of response messages to be transmitted.

* * * * *